Sept. 16, 1952 P. H. SCHERER 2,610,758
FISHING CREEL
Filed Aug. 1, 1950
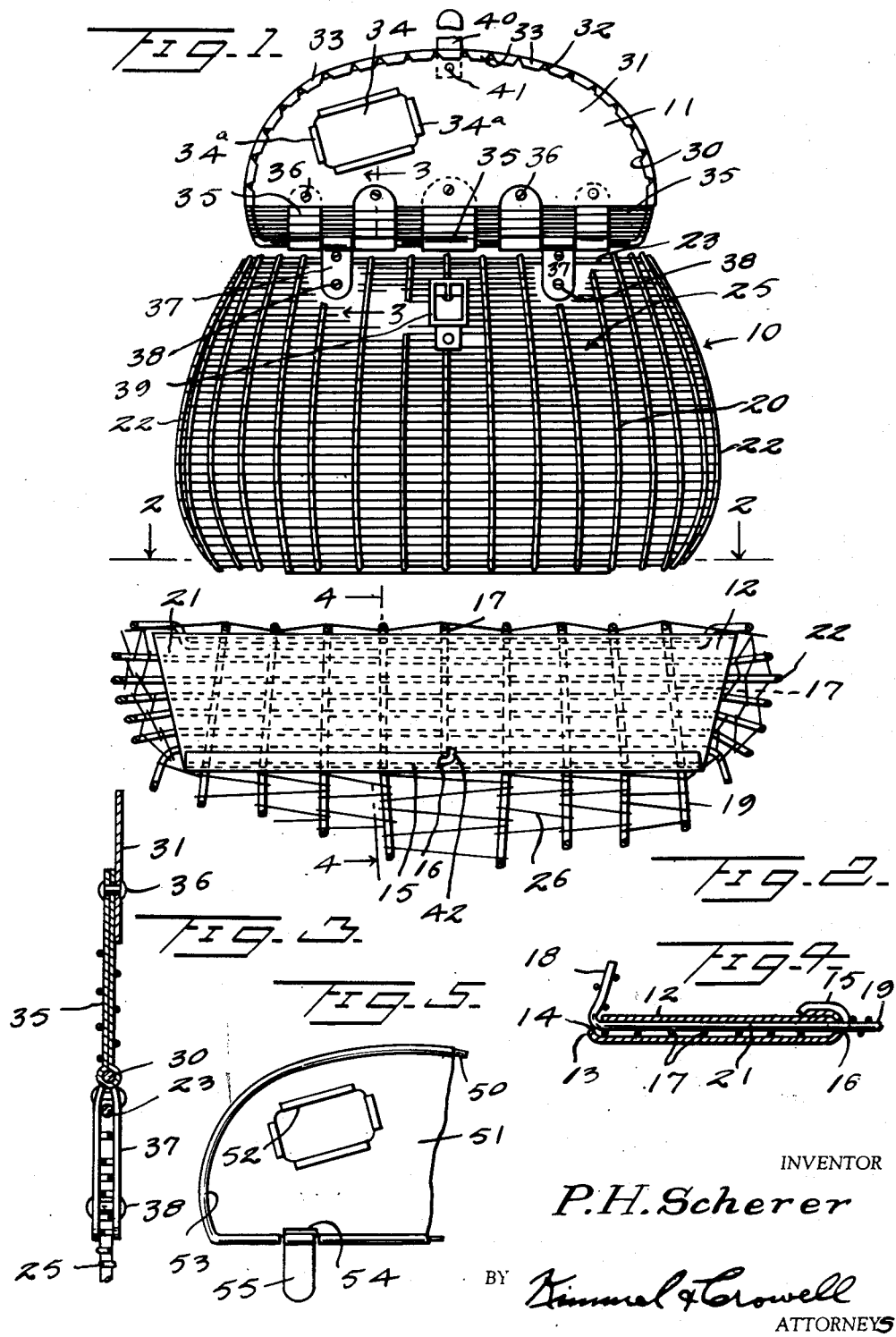
INVENTOR
*P.H.Scherer*
BY *Kimmel & Crowell*
ATTORNEYS Patented Sept. 16, 1952

2,610,758

UNITED STATES PATENT OFFICE 2,610,758

FISHING CREEL

Patrick H. Scherer, Hot Springs, S. Dak.

Application August 1, 1950, Serial No. 177,107

3 Claims. (Cl. 220—19)

This invention relates to a fishing creel and more particularly to such a creel constructed of interwoven light metal strips or the like.

A primary object of the invention is the provision of an improved fishing creel which is sanitary, non-corrosive, odorless, long-lived and light to carry.

A further object of the invention is the provision of such a creel which may be easily and simply manufactured.

Other objects will in part be obvious and will in part be pointed out as the description of the invention provides and shown in the accompanying drawing wherein there is disclosed a preferred embodiment of this inventive concept.

In the drawing—

Figure 1 is a front elevational view of one form of creel embodying the instant invention, parts thereof being broken away, and the lid being shown in raised position, Figure 2 is a sectional view taken substantially along the line 2—2 of Figure 1 as viewed in the direction indicated by the arrows, Figure 3 is an enlarged sectional view taken substantially along the line 3—3 of Figure 1, as viewed in the direction indicated by the arrows, Figure 4 is an enlarged sectional view taken substantially along the line 4—4 of Figure 2, as viewed in the direction indicated by the arrows; and Figure 5 is a fragmentary plan view of a modified form of cover construction.

Similar reference characters refer to similar parts throughout the several views of the drawing.

Referring now to the drawing in detail there is generally indicated at 10 a creel body provided with a cover or lid 11. The body 10 is comprised of a base plate 12 of any suitable material, preferably a lightweight metal such as aluminum, magnesium or dural, which as best shown in Figure 4, is reverted upon itself as at 13 and provided along the fold line with a series of apertures 14. The opposite edge of the plate is also overlapped or reverted as at 15 to overlie the opposite side thereof, and provided with a series of apertures 16. Extending through the aligned apertures 14 and 16 are a series of spaced transverse wire members 17, which are bent upwardly as at 18 to form uprights for the rear wall of the creel. The opposite ends of the wires 17 extend forwardly to complete the base of the creel as shown at 19, and are thence bent upwardly to form uprights 20 forming a front wall of the device. Additional wires 21 are also provided, extending longitudinally of the plate, and are bent upwardly at their opposite ends as at 22 to form uprights for the side walls of the device. All of the wires 17 and 21 at their upper extremities are reverted and suitably secured to a wire 23 defining the periphery of the upper extremity of the creel, and forming a rim therefor.

A single strand 25, preferably of relatively flat sheet metal such as aluminum, is interwoven about all of the upright members, preferably started at a suitable point adjacent the top thereof, and interwoven in a known manner inwardly and outwardly of alternate members. The strand 25 continues downwardly to form a portion of the bottom as indicated at 26, being successively wound about the upright members at their flattened lower portions to form a perforate base portion.

The ends of strip 25 may be secured to any wire member 17 or 21 in any desired manner as by spot welding or electro-welding.

The lid 11 includes a rim 30 of the general configuration of previously described rim 23, defining an arcuate top, the major portion of which is covered by a sheet of aluminum or the like 31, the edge of which is provided with a series of V-shaped cuts 32 and reverted as at 33 to overlie the rim, being secured thereto in any desired manner as by spot welding. A suitable aperture 34 in the top, the edges of which may be reverted as at 34a to provide a smooth contour, is provided for the admission of fish to the creel when the lid is closed. A series of reinforcing strips 35 extend from one edge of rim 30 inwardly to the edge of plate member 31 and are secured thereto by rivets 36 or the like. Additional strip members 37 are also secured at spaced intervals about rim 31 and extended downwardly to overlie rim 23 and extend on opposite sides of the rear wall of the creel as best shown in Figure 3, to form hinges. The opposite ends of the members 37 are secured to the creel body as by rivets 38.

A suitable fastening means such as a buckle 39 may be provided on the front wall of the creel to coact with the strap 40, suitably secured as by a rivet 41 to a central front portion of plate 31 of lid 11.

Means are also provided for securely retaining base plate 12 against slippage or displacement and may take the form of a cut-off end 42 of one of the transverse wires 17, as best shown in Figure 2, which is extended upwardly through its associated aperture 16 and reverted as shown.

A modified form of lid construction is disclosed in Figure 5, wherein the lid is comprised of a rim 50 similar to the previously described rim 30 which is covered by a sheet metal plate 51 having an aperture 52 therein, corresponding to aperture 34 and which has a reverted edge 53 overlying and surrounding the rim 50 and secured thereto in any desired manner. In this form of lid, cut-outs 54 are provided at spaced points along the rear edge of sheet 51 for the accommodation of strap hinges 55 which surround rim 50 and are applied to the creel in the same manner as previously discussed hinges 37.

From the foregoing it will now be seen that there is herein provided an improved fishing creel which accomplishes all the objects of this invention and others, including many advantages of great practical utility.

As many embodiments may be made of this inventive concept and as many modifications may be made in the embodiment herein shown and set forth, it is to be understood that all matter herein is to be interpreted merely as illustrative and not in a limiting sense.

What I claim is:

1. In a fishing creel, a base plate comprised of a single doubled and folded sheet of lightweight metal open at its ends and provided with spaced apertures along the fold line thereof, a series of wire members extending longitudinally and transversely through said base plate, the transversely extending wires extending through said apertures and upwardly curved at their opposite ends to form side and end uprights, a unitary wire rim at the top of said creel to which the ends of said uprights are secured and a single unitary strip of flat metallic material interwoven about all of said uprights, the top and bottom edges of adjacent interwoven portions contacting each other to form substantially closed side and end walls and a portion of the bottom of said creel.

2. The construction of claim 1 wherein the base plate is of substantially less area than the total area of the bottom of the creel and wherein one edge thereof is reverted over the other edge and provided with spaced apertures along the reverted fold line aligned with the first mentioned apertures, through which the transverse wires extend.

3. The construction of claim 2 wherein at least one of the transverse wires is cut short at one fold line of the base plate and reverted thereover to secure said base plate in position.

PATRICK H. SCHERER.

REFERENCES CITED

The following references are of record in the file of this patent:

UNITED STATES PATENTS

| Number | Name | Date |
|---|---|---|
| 165,045 | Wheeler | June 29, 1875 |
| 528,491 | Probola | Oct. 30, 1894 |
| 577,151 | Taylor | Feb. 16, 1897 |
| 813,499 | Johnson | Feb. 27, 1906 |
| 1,137,698 | Clark | Apr. 27, 1915 |
| 1,388,187 | Marble | Aug. 23, 1921 |
| 2,486,838 | Goldstrom | Nov. 1, 1949 |

FOREIGN PATENTS

| Number | Country | Date |
|---|---|---|
| 22,305 | Great Britain | 1891 |
| 40,399 | Denmark | June 20, 1929 |